(12) United States Patent
Johansson

(10) Patent No.: US 6,588,239 B1
(45) Date of Patent: Jul. 8, 2003

(54) LOCKING DEVICE

(75) Inventor: Lars Johansson, Kumla (SE)

(73) Assignee: Stacker Stop Euro AB (SE)

( * ) Notice: Subject to any disclaimer, the term of this patent is extended or adjusted under 35 U.S.C. 154(b) by 0 days.

(21) Appl. No.: 09/763,336

(22) PCT Filed: Aug. 19, 1999

(86) PCT No.: PCT/SE99/01412
§ 371 (c)(1),
(2), (4) Date: Apr. 19, 2001

(87) PCT Pub. No.: WO00/10820
PCT Pub. Date: Mar. 2, 2000

(30) Foreign Application Priority Data

Aug. 19, 1998 (SE) .............................................. 9802770

(51) Int. Cl.⁷ .............................................. E05B 73/00
(52) U.S. Cl. ..................... 70/14; 70/34; 70/58; 70/232; 70/258; 280/507
(58) Field of Search .............................. 70/14, 34, 58, 70/232, 258; 280/507

(56) References Cited

U.S. PATENT DOCUMENTS

| | | | | | |
|---|---|---|---|---|---|
| 3,884,055 A | * | 5/1975 | Vuillemot | .................... | 280/507 |
| 4,379,393 A | * | 4/1983 | Schott et al. | .............. | 24/114.5 |
| 4,380,160 A | * | 4/1983 | Hoffman | .......................... | 70/14 |
| 4,407,146 A | * | 10/1983 | Nielsen, Jr. | .................. | 285/80 |
| 4,571,964 A | * | 2/1986 | Bratzler | ....................... | 280/507 |
| 5,297,407 A | * | 3/1994 | Tarr | ............................. | 70/232 |
| 5,351,511 A | * | 10/1994 | Bernier | ....................... | 280/507 |
| 6,161,402 A | * | 12/2000 | Moore | ........................... | 70/14 |
| 6,202,453 B1 | * | 3/2001 | Disher et al. | ............... | 280/507 |
| 6,244,614 B1 | * | 6/2001 | Bonvillain et al. | ......... | 280/507 |

FOREIGN PATENT DOCUMENTS

DE 4135726 A1 * 5/1993 ........... B60R/25/00

* cited by examiner

Primary Examiner—Anthony Knight
Assistant Examiner—Christopher Boswell
(74) Attorney, Agent, or Firm—Baker & McKenzie

(57) ABSTRACT

The present invention relates to a multipurpose device designed to prevent thefts of trailers, heavy tows and so called dollies, i.e., having coupling elements with a pull rod and a turn table, designed to haul a trailer by means of a truck, all of which being provided with coupling devices, designed to connect the trailers to a traction vehicle. The locking device comprises a box-shaped lock house (1) in which the coupling device on the tow, the trailer and the dolly is designed to be positioned and locked by means of a locking shaft (4), which is inserted through the lock house (1) and can be located in the lock house (1) in various positions, depending on the character of the coupling device to be locked, and consequently said coupling device is enclosed in the lock house (1), and the tow, the trailer or the dolly is prevented from being connected to any unauthorized traction trailer.

7 Claims, 5 Drawing Sheets

LOCKING DEVICE

BACKGROUND AND SUMMARY OF THE INVENTION

The present invention relates to a multipurpose locking device, designed to prevent thefts of trailers, heavy tows and so called dollies, i.e., having coupling elements with a pull rod and a turn table, designed to haul a trailer by means of a truck, all of which are provided with coupling devices designed to effect a connection with a traction vehicle.

Within the above-mentioned technical field, a plurality of solutions have been suggested to prevent heavy tows, trailers and dollies from being stolen when they are parked. Due to various (e.g.) regulations in various countries, regarding the allowable length of vehicles, sometimes loaded trailers as well as dollies must be parked in parking areas for quite a long time, particularly at the borders of a country, but later be connected to trucks, traction vehicles for tailers, etc. This means that these trailers, towable wagons and dollies are sometimes stolen, which results in large economic losses. In Germany, for example, the allowable length of a car and its trailer is just 18 m, whereas in Sweden the allowable length is 24 m. A car and a dolly as well as a trailer have a length of 25.5 m while a traction vehicle for a trailer and a trailer have a length of 18.35 m, which is the European standard.

Known locking devices for towable wagons, trailers and dollies are difficult to apply on the eyelet of the pull rod of the trailer or the dolly or on the kingpin of the trailer. These eyelets and kingpins are lubricated with grease and the grease sticks to the locking device as well as the operator, when the locking device is applied and removed. Also, different locking devices must be used for eyelets and kingpins. This means that the operator must have available several locking devices for eyelets and several locking devices for kingpins when the tow, the trailer or the dolly is to be locked during parking. The whole procedure to lock these vehicle parts is complicated and intricate and the operator and locking devices are soiled.

BRIEF DISCLOSURE OF THE INVENTION

The object of the present invention is to eliminate the above-mentioned drawbacks of locking devices for towable wagons, trailers or dollies, and to provide a multipurpose locking device for this purpose, which smoothly and easily can prevent a trailer, a tow or a dolly from being stolen, i.e., being connected to an unauthorized traction vehicle when said towable wagons are parked without a traction vehicle.

According to the inventive idea, the above-mentioned problems are solved by means of a locking device which comprises an integral box-shaped lock house in which the coupling device on the tow, the trailer or the dolly is locked to the locking device by means of a locking shaft which extends through the main part of the locking device and in this way prevents the tow, the trailer or the dolly from being connected to any traction vehicle.

A locking device is obtained according to the invention, which can be used on an eyelet as well as on a kingpin, requires insignificant efforts when it is applied, results in a more secure locking, is difficult to break, is economic to manufacture, protects the operator from being soiled by the grease, which surrounds the coupling device when it is enclosed by the locking device, is easy to store since all the grease and dirt is enclosed by the locking device and consequently does not soil other tools or the like, as well as have a long life.

DESCRIPTION OF A PREFERRED EMBODIMENT OF THE PRESENT INVENTION

Figure 1:
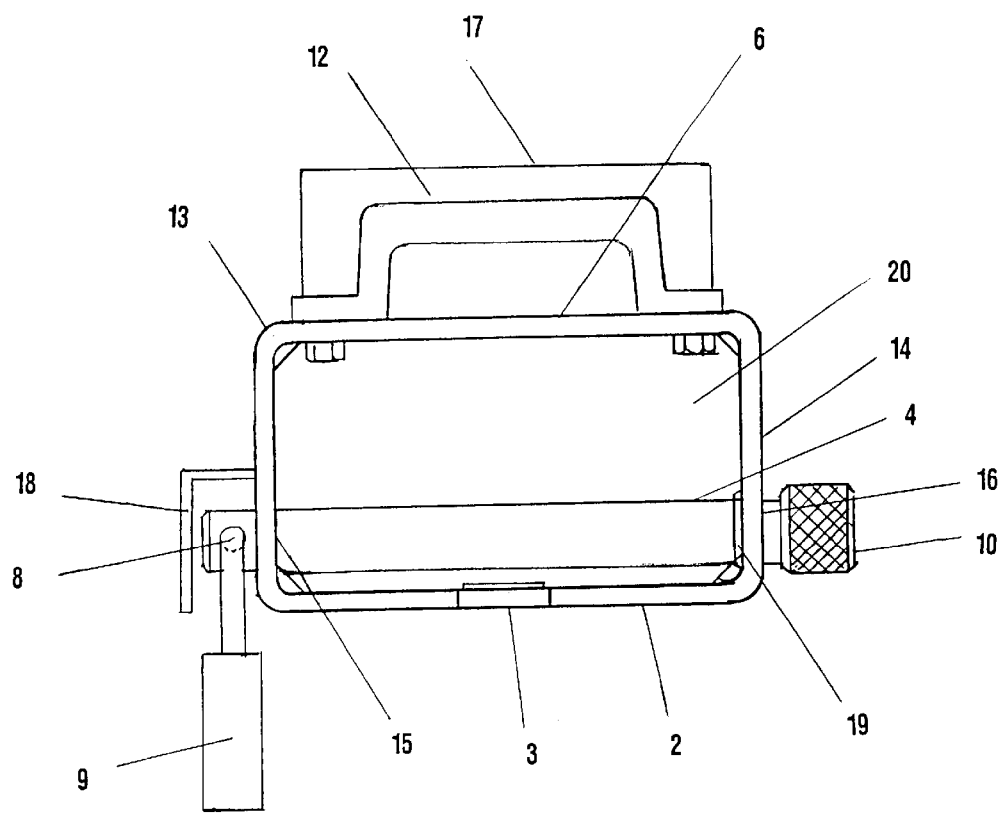
FIG. 1 is an elevational view of a locking device in accordance with the present invention.
Figure 2:
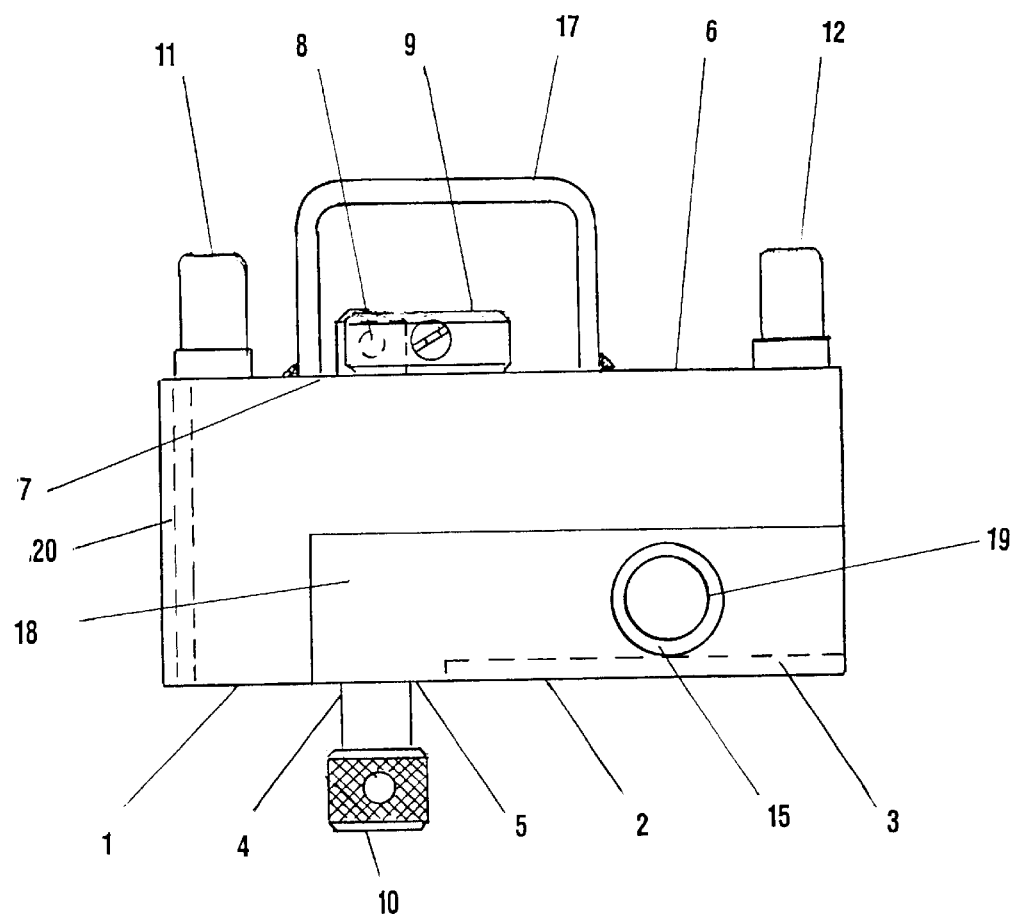
FIG. 2 is a view of one end of the locking device shown in FIG. 1.
Figure 3:
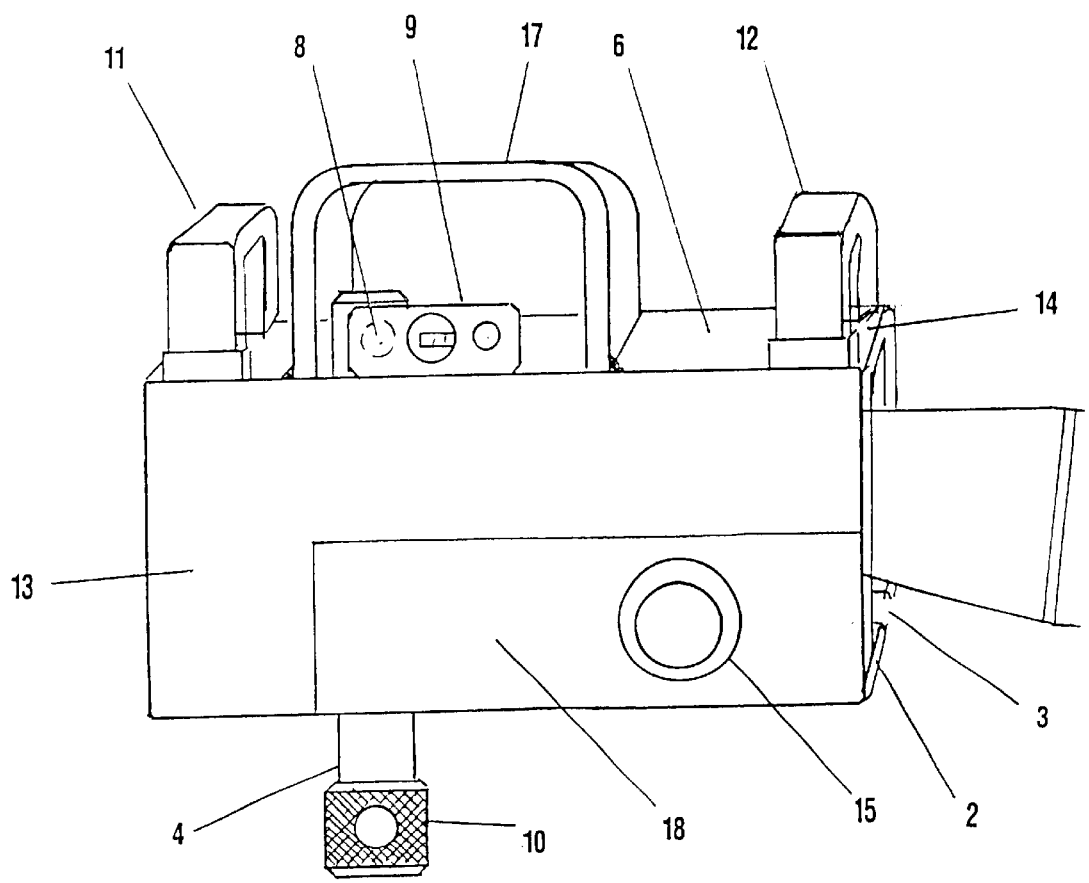
FIG. 3 shows the locking device of FIG. 1 applied on a towing eyelet, disposed on a tow and locked by means of a locking shaft and a padlock.
Figure 4:
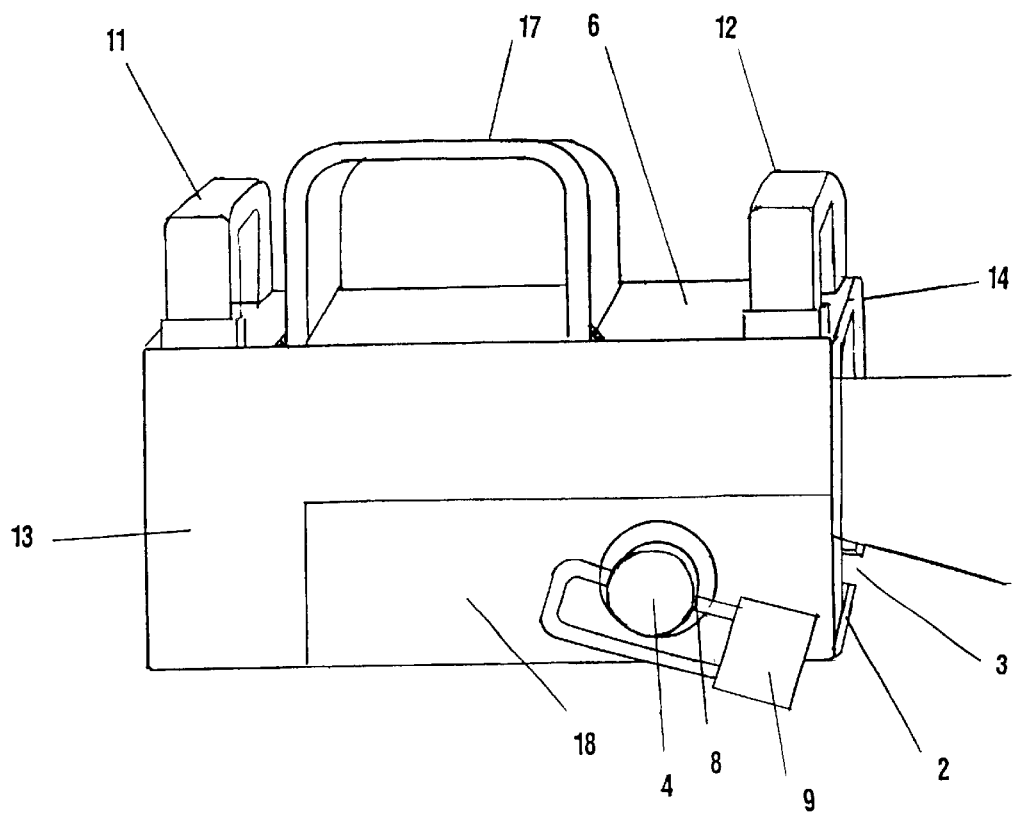
FIG. 4 is a perspective view showing the locking device in accordance with the present invention applied on a dolly, locked by means of a locking shaft and a padlock in the locking device.
Figure 5:
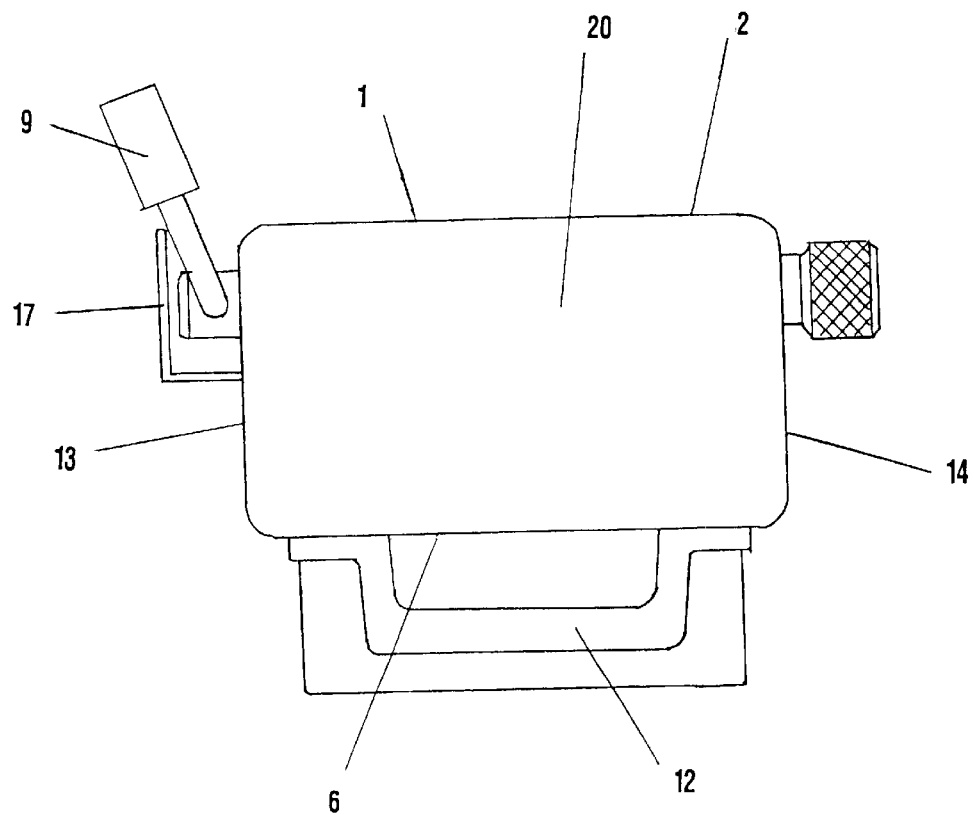
FIG. 5 is a perspective view of a locking device in accordance with the present invention applied on a kingpin on a trailer, locked by means of a locking shaft and a padlock in the locking device.

FIGS. 1 through 5 show that the device made in accordance with the present invention comprises a box-shaped lock house 1, which is made of a piece of a square tube of steel, annealed in a special way, and has two pairs of mutually parallel sides and an end wall (20). Lock house 1 comprises a first side 2 with a U-shaped elongated recess 3, which extends into the tube roughly up to its central portion and into which recess the kingpin of a trailer is to be introduced and locked by means of a locking shaft 4. Also, this first side 2 has a through hole 5, and on a second side 6, a through hole 7 is made with an axial direction in relation to hole 5. In case a tow is to be locked, the towing eyelet is introduced into the lock house 1 and coaxially positioned through hole 5, the towing eyelet and hole 7. Locking shaft 4 has a through hole 8 at one of its ends, through which the shackle of a padlock 9 is to be inserted, and its opposite end has a head 10, the diameter of which is larger than the diameter of said holes. Above hole 7 on second side 6, a shield 17 is welded to the side in order to protect padlock 9, in case attempts are made to break it. Also, two handles 11 and 12, are mounted on this second side of the lock house 1, in order to facilitate the handling of it.

Lock house 1 also includes a third side 13 and a fourth side 14, which are axially directed through holes 15 and 16 which are to receive locking shaft 4 in order to lock the kingpin on a trailer, which locking shaft 4 is designed to be introduced from the exterior of lock house 1 and into axially directed holes 15 and 16 in each one of opposite sides 13 and 14 when a kingpin has been inserted into lock house 1 via U-shaped longitudinal recess 3 in first side 2, and then the shackle of a padlock 9 is to be introduced through hole 8 in the locking shaft. A shield 18 is also mounted above hole 16. The main part of it has a short side 18, which is welded to each one of the short ends of the opposite sides and serves as a cage, a room for the coupling gear.

Plastic bushes 19 are mounted at holes 5, 7, 15 and 16, and are designed to scrape off the machine grease which has been applied to the kingpin and the towing eyelet.

The locking device is used in the following manner:

When a towing eyelet is locked in a tow:
  The locking device is lifted with both hands by handles 11 and 12 and the eyelet of the pull rod is inserted into lock house 1. From below, locking shaft 4 is pushed upwards in a vertical direction through holes 5 and 7, and then the shackle of the padlock 9 is pushed through hole 8 in locking shaft 4 and is locked.

When a trailer is locked:

The locking device is turned upside down, the handles being directed downwards toward the ground, and then the kingpin is pushed into lock house 1 through U-shaped recess 3 all the way up to its bottom, and then locking shaft 4 is inserted through the horizontally, axially extending holes 15 and 16, and finally, the shackle of padlock 9 is inserted through hole 8 in the locking shaft and is locked.

When a dolly is locked:

The locking device is lifted with both hands by handles 11 and 12, and the eyelet of the dolly is inserted into lock house 1 through U-shaped recess all the way up to its bottom, and then locking shaft 4 is inserted into horizontally, axially extending holes 15 and 16, and finally the shackle of padlock 9 is inserted through hole 8 in locking shaft 4 and is locked.

It must be emphasized that the invention can be modified within the scope of protection defined by the enclosed claims. The lock house can be made of various materials which are impact resistant and strong. The locking shaft suitably is made of annealed steel and the padlock suitably is drilling resistent and belongs to grade 3.

What is claimed is:

1. A multipurpose locking device designed to prevent thefts of trailers, heavy tows and so called dollies, i.e., having coupling elements with a pull rod and a turntable, designed to tow a trailer by means of a truck, all of which being provided with coupling devices, designed to connect them to a traction vehicle, characterized in that the locking device comprises a box-shaped lock house (1) in which the coupling device on the tow, the trailer or the dolly is designed to be positioned and locked by means of a locking shaft (4), said lock house having a plurality of positions for receiving said locking shaft through the lock house (1) at one of said plurality of positions, depending on the nature of the coupling device to be locked and consequently that the coupling device is enclosed in the lock house (1), which prevents the tow, the trailer or the dolly from being connected to any unauthorized traction vehicle.

2. A multipurpose locking device designed to prevent thefts of trailers, heavy tows and so called dollies, in accordance with claim 1, characterized in that the locking shaft (4) is a bolt-like pin (4) with a through hole (8) in its one end, through which a padlock (9) is to be inserted.

3. A multipurpose locking device designed to prevent thefts of trailers, heavy tows and so called dollies according to claim 2, characterized in that the lock house (1) is a square tube having an end wall (20) with two pairs of opposite sides (2, 6, 13, 14) which are provided with through axially directed holes (5, 7 and 15, 16, respectively) for the locking shaft (4) as well as a U-shaped recess (3) in one of said sides (2) into which a kingpin is to be inserted.

4. A multipurpose locking device designed to prevent thefts of trailers, heavy tows and so called dollies according to claim 3, characterized in that around the holes (5, 7, 15 and 16) in the lock house (1) a respective scraping-off device (19) in the form of a bush is mounted.

5. A multipurpose locking device designed to prevent thefts of trailers, heavy tows and so called dollies according to claim 4, characterized in that above the holes (7, 16) in the lock house (1), which in use are the closest to the holes (8) of the locking shaft (4) and consequently also the padlock (9), a shield (17 and 18, respectively) against blows is mounted.

6. A multipurpose locking device designed to prevent thefts of trailers, heavy tows and so called dollies according to claim 1, characterized in that the lock house (1) is a square tube with an end gable (20).

7. A multipurpose locking device designed to prevent thefts of trailers, heavy tows and so called dollies according to claim 1, characterized in that the lock house (1) is a round tube with an end wall (20).

* * * * *